(12) United States Patent
Yohannes et al.

(10) Patent No.: US 10,589,623 B1
(45) Date of Patent: Mar. 17, 2020

(54) FLOATING ENGINE POWERTRAIN

(71) Applicant: Textron Inc., Providence, RI (US)

(72) Inventors: Zekarias W. Yohannes, Augusta, GA (US); Matthew Wilson, Augusta, GA (US); David A. Smith, Augusta, GA (US)

(73) Assignee: TEXTRON INNOVATIONS INC., Providence, RI (US)

( * ) Notice: Subject to any disclaimer, the term of this patent is extended or adjusted under 35 U.S.C. 154(b) by 0 days.

(21) Appl. No.: 16/135,406

(22) Filed: Sep. 19, 2018

(51) Int. Cl.
*B60K 16/00* (2006.01)
*B60K 17/16* (2006.01)
*B60K 5/12* (2006.01)

(52) U.S. Cl.
CPC ............... *B60K 17/16* (2013.01); *B60K 5/12* (2013.01)

(58) Field of Classification Search
CPC .......... B60K 17/30; B60K 6/40; B60K 11/08; B60K 17/16; B60K 5/12
See application file for complete search history.

(56) References Cited

U.S. PATENT DOCUMENTS

| | | | | |
|---|---|---|---|---|
| 3,497,025 A | * | 2/1970 | Rosenkrands | B60K 5/1216 180/56 |
| 5,042,870 A | * | 8/1991 | Yura | B60K 11/08 180/903 |
| 5,460,236 A | * | 10/1995 | Lewis | B60K 17/16 180/253 |
| 6,390,224 B1 | * | 5/2002 | Yoshida | B62D 21/00 180/311 |
| 7,370,886 B2 | * | 5/2008 | Luttinen | B60L 58/40 280/781 |
| 7,454,907 B1 | * | 11/2008 | Hauser | B60K 17/105 60/487 |
| 7,836,999 B2 | * | 11/2010 | Kato | B62D 21/155 180/312 |
| 8,196,696 B2 | * | 6/2012 | Karube | B60G 3/20 180/311 |

(Continued)

OTHER PUBLICATIONS

The pictures are 'pictures of golf cart drivetrain having an engine connected to a transaxle'. These were taken during an offer for sale by a 3rd party, Mike Major of Advanced Datum Inc, on Aug. 31, 2017.

(Continued)

*Primary Examiner* — Hau V Phan
(74) *Attorney, Agent, or Firm* — Sandberg Phoenix & von Gontard PC

(57) ABSTRACT

A vehicle transaxle comprising a plurality of mounting flanges fixedly mountable to an axle tube of the vehicle absent any additional structure for mounting the transaxle to the vehicle. The axle tube houses a wheel axle to which the transaxle is operably couplable. The transaxle additionally comprises a transaxle mounting collar that is fixedly mounted to or integrally formed with a housing of the transaxle. The mounting collar is structured and operable to have a prime mover of the vehicle mounted thereto and to support the weight/mass of the prime mover such that the prime mover is mountable to the vehicle via only the mounting collar absent any additional structure for mounting the prime mover to the vehicle such that the prime mover can be cantilevered from (e.g., suspended from) the transaxle, e.g., the prime mover is 'free floating'.

20 Claims, 9 Drawing Sheets

(56) References Cited

U.S. PATENT DOCUMENTS

| | | | | |
|---|---|---|---|---|
| 8,857,554 | B1 * | 10/2014 | Keller | B60K 17/30 180/253 |
| 9,045,163 | B2 * | 6/2015 | Theodore | B62D 21/02 |
| 2004/0118627 | A1 * | 6/2004 | Ohtsuki | B60T 1/062 180/312 |
| 2012/0175863 | A1 * | 7/2012 | Theodore | B60K 6/40 280/798 |
| 2016/0355054 | A1 * | 12/2016 | Jensen | B60B 35/16 |
| 2017/0045126 | A1 * | 2/2017 | Kluck | B60K 17/16 |
| 2018/0259052 | A1 * | 9/2018 | Chinitz | F16H 48/42 |

OTHER PUBLICATIONS

The website link http://www.boulderengines.com/ (attached pics of the website homepage) was in operation at least as early as Aug. 2018, and the installation manual was downloaded from the website.

Boulder Engines Installation Manual from http://www.boulderengines.com/.

The pictures are 'pictures of golf cart drivetrain having an engine connected to a transaxle'. These were taken during an offer for sale by a 3rd party, Mike Major of Advanced Datum Inc, on Aug. 31, 2018.

* cited by examiner

FLOATING ENGINE POWERTRAIN

FIELD

The present teachings relate to powertrains for lightweight utility vehicles, e.g., golf cars, and more particularly to a lightweight utility vehicle powertrain having an engine that is cantilevered from, and supported by, a wheel axle tube of the vehicle, absent any other mounting or connection to vehicle chassis or other vehicle structure.

BACKGROUND

The statements in this section merely provide background information related to the present disclosure and may not constitute prior art.

A traditional known approach to gas power train design is to mount the gas or diesel engine and transaxle to the vehicle chassis/frame structure or other vehicle structure independently. Other known designs utilize a common platform such as a tray or pan connected to the vehicle chassis/frame structure or other vehicle structure to mount the engine and transaxle to the vehicle. In both instances, power is transferred from the engine power take off (e.g., output shaft) to the transaxle input shaft via external clutches (e.g., a continuously variable transmission (CVT)) connected to the engine and/or transaxle via a CVT belt. For example, in various traditional powertrain designs the engine is mounted to the vehicle using an isolator on the vehicle chassis and the same is done to mount the transaxle. With such isolator mounted configurations, it is critical to keep the CVT clutches' center distance fixed. This requirement is crucial for a predictable CVT system performance.

Such known designs generally include many parts and components that increase costs and are known to generate significant undesirable engine and powertrain vibration that is transmitted to the vehicle.

SUMMARY

Generally, the present disclosure provides a powertrain having a prime mover (e.g., an internal combustion engine, an electric motor, or any other device structured and operable to deliver power/torque/motive force) hard-mounted to the vehicle transaxle that can be mounted to a vehicle drive axle (e.g., a vehicle rear wheel drive axle) and allowed to 'free float' without any additional engine mounts and supports. In such instances, the vehicle suspension components (e.g., springs, shocks, struts, spring/strut combination, etc.), are mounted, connected or otherwise secured to the vehicle axle assembly and to the vehicle frame/chassis, and thereby provide the only support and vibration path for the sprung mass, i.e., the 'free floating' prime mover. In various instances, the prime mover output shaft can be directly coupled to the transaxle input shaft, whereby motive power from the prime mover is transferred to the wheel(s). The 'free floating' powertrain design allows the prime mover to move freely at its front/distal/free end without inducing or transferring vibrations to the vehicle frame, other than through the vehicle suspension components (e.g., springs). Additionally, the powertrain design of the present disclosure is compact and provides a sealed system that has no rotating components exposed to the vehicle operators and users.

Particularly, in various embodiments, the present disclosure provides a vehicle transaxle that comprises a plurality of mounting flanges (e.g., 2 or more) fixedly mountable to the at least one axle tube of the vehicle absent any additional structure for mounting the transaxle to the vehicle. The at least one axle tube houses at least one wheel axle to which the transaxle is operably couplable. The transaxle additionally comprises a transaxle mounting collar that is fixedly mounted to or integrally formed with a housing of the transaxle. The mounting collar is structured and operable to have a prime mover (e.g., an internal combustion engine, an electric motor, or any other device structured and operable to deliver power/torque/motive force) of the vehicle mounted thereto and to support the weight/mass of the prime mover such that the prime mover is mountable to the vehicle via only the mounting collar absent any additional structure for mounting the prime mover to the vehicle such that the prime mover can be cantilevered from (e.g., suspended from) the transaxle, e.g., the prime mover is 'free floating'.

In various other embodiments, the present disclosure provides a vehicle powertrain that comprises a drive axle assembly that includes at least one wheel axle and at least one axle tube that houses the at least one wheel axle. The at least one axle tube is connectable to a pair of vehicle suspension components (e.g., coil springs, leaf springs, shocks, struts, spring/strut combination, etc.) that are connectable to a chassis or frame of the vehicle such that the at least one axle tube is operably connectable to the vehicle chassis/frame via the vehicle suspension components. The powertrain additionally comprises a transaxle operably coupled to the at least one wheel axle and fixedly mounted to the at least one axle tube absent any additional structure for mounting the transaxle to the vehicle. The powertrain further comprises a transaxle mounting collar that is fixedly mounted to or integrally formed with a housing of the transaxle. Still further, the powertrain comprises a prime mover (e.g., an internal combustion engine, an electric motor, or any other device structured and operable to deliver power/torque/motive force) operably coupled to the transaxle and fixedly mounted to the transaxle mounting collar absent any additional structure for mounting the prime mover to the vehicle such that the prime mover is cantilevered from the transaxle.

In yet other embodiments, the present disclosure provides a vehicle that comprises a chassis or frame, a pair of vehicle suspension components (e.g., coil springs, leaf springs, shocks, struts, spring/strut combination, etc.) connected to the chassis/frame, and a powertrain mounted to the chassis/frame via the suspension components absent any additional structure for mounting the powertrain to the vehicle. In various instances the powertrain comprises a drive axle assembly that includes at least one wheel axle and at least one axle tube that houses the at least one wheel axle. The at least one axle tube is connectable to a pair of vehicle suspension components (e.g., coil springs, leaf springs, shocks, struts, spring/strut combination, etc.) that are connectable to the chassis/frame of the vehicle such that the at least one axle tube is operably connectable to the vehicle chassis/frame via the vehicle suspension components. The powertrain additionally comprises a transaxle operably coupled to the at least one wheel axle and fixedly mounted to the at least one axle tube absent any additional structure for mounting the transaxle to the vehicle. The powertrain further comprises a transaxle mounting collar that is fixedly mounted to or integrally formed with a housing of the transaxle. Still further, the powertrain comprises a prime mover (e.g., an internal combustion engine, an electric motor, or any other device structured and operable to deliver power/torque/motive force) operably coupled to the transaxle and fixedly mounted to the transaxle mounting collar absent any additional structure for mounting the prime mover to the vehicle such that the prime mover is cantilevered from the transaxle.

While the present disclosure is exemplarily directed to golf cars, it should be understood that the features disclosed herein can have application to other types of vehicles such as most lightweight vehicles that are not designated for use on roadways, e.g., maintenance vehicles, cargo vehicles, shuttle vehicles, other all-terrain vehicles (ATVs), utility task vehicles (UTVs), recreational off-highway vehicles (ROVs), side-by-side vehicles (SSV), worksite vehicles, buggies, motorcycles, watercraft, snowmobiles, tactical vehicles, etc.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
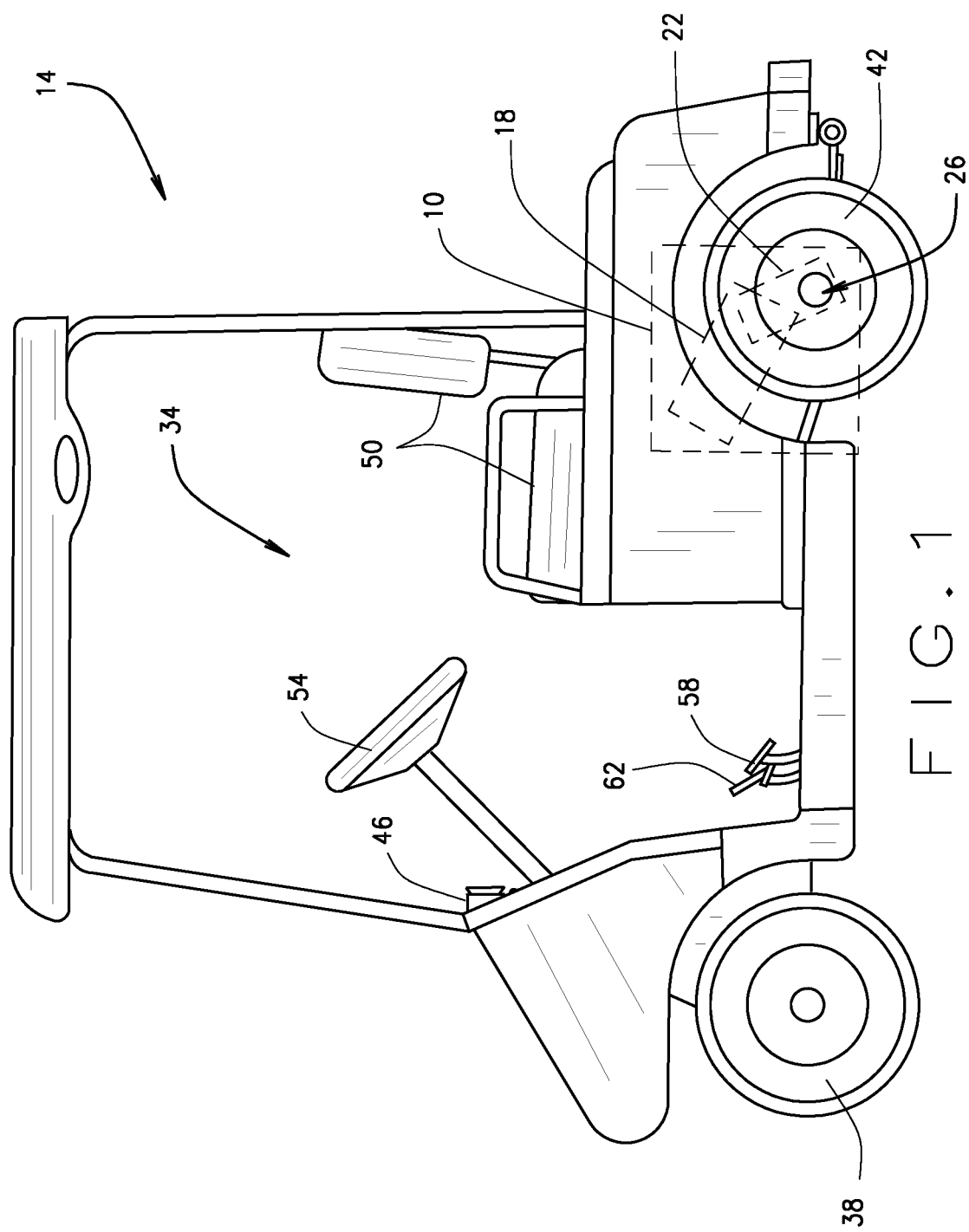
FIG. 1 is a side view of an exemplary vehicle including a 'floating' powertrain comprising a prime mover cantilevered from a transaxle absent any other structure for connecting the prime mover to the vehicle, in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Referring now to FIG. 1, the present disclosure generally provides a 'floating' powertrain 10 for a lightweight vehicle 14, such as a golf car. Particularly, the powertrain 10 comprises a prime mover 18 (e.g., an internal combustion engine, an electric motor, or any other device structured and operable to deliver power/torque/motive force) that is fixedly mounted to and cantilevered from (e.g., suspended from) a transaxle 22 that is mounted only to an axle assembly 26 absent any other structure for connecting the transaxle 22 and prime mover 18 to the vehicle 14. More specifically, the prime mover 18 is only operationally connected (e.g., indirectly connected) to a vehicle chassis and/or frame structure 30 (shown in FIGS. 2 and 3) through its connection and mounting to the transaxle 22.

Although the vehicle 14 is exemplarily illustrated as a golf car throughout the various figures, it should be understood that in various embodiments, the vehicle 14 can be a maintenance vehicle, a cargo vehicle, a shuttle vehicle, an all-terrain vehicle (ATV), a utility-terrain vehicle (UTV), a worksite vehicle, a buggy, any lightweight vehicle, or any other suitable type of utility or low-speed vehicle that is not designated for use on roadways, and remain within the scope of the present disclosure. The vehicle 14 generally includes a passenger compartment 34, one or more front wheels 38 operationally connected to the chassis or other frame structure 30, one or more rear wheels 42 operationally connected to the axle assembly 26, and the powertrain 10. The passenger compartment 34 generally includes the dash/instrument console 46, a seating structure 50 structured and operable to provide seating for one or more vehicle occupants, a steering wheel 54 for use by the vehicle operator to control the directional movement of the vehicle 14, a brake pedal 58 for use by the vehicle operator to control slowing and stopping of the vehicle 14, and an accelerator pedal 62 for use by the vehicle operator to control the torque/power delivered by the prime mover 18 to one or more of the rear and/or front wheels 42 and/or 38.

As used herein, the word "forward" and the phrase "forward of" are used to describe the direction from a named component or structure toward the front of the vehicle 14. For example, the statement that the steering wheel 54 is located "forward of" the longitudinal center means the steering wheel 54 is located within an area that extends from the longitudinal center of the vehicle 14 to the front of the vehicle 14. Similarly, as used herein, the word "rearward" and the phrase "rearward of" are used to describe the direction from a named component or structure toward the rear of the vehicle 14. For example, the statement that a component of the vehicle 14 or powertrain 10 is located "rearward of" the longitudinal center means the component is located within an area that extends from the longitudinal center of the vehicle 14 to the rear of the vehicle 14.

Additionally, although the powertrain 10 of the present disclosure will, by way of example, be shown and described herein as structured and operable to deliver motive force to the rear wheel(s) 42, via the axle assembly 26 (shown by way of example as a rear axle assembly), it should be understood that, in various embodiments, the powertrain 10 of the present disclosure can be structured and operable to deliver motive force to the front wheel(s) 42, via a front axle assembly (not shown), and remain within the scope of the present disclosure. In yet other embodiments, it is envisioned that powertrain 10, as described herein can be implemented in a four-wheel drive vehicle including a power take off assembly (not shown) operably connected to the transaxle 22 to deliver motive force from the prime mover 18 to one or more of the front wheel(s) 38 and/or rear wheel(s) 42.

Figure 2:
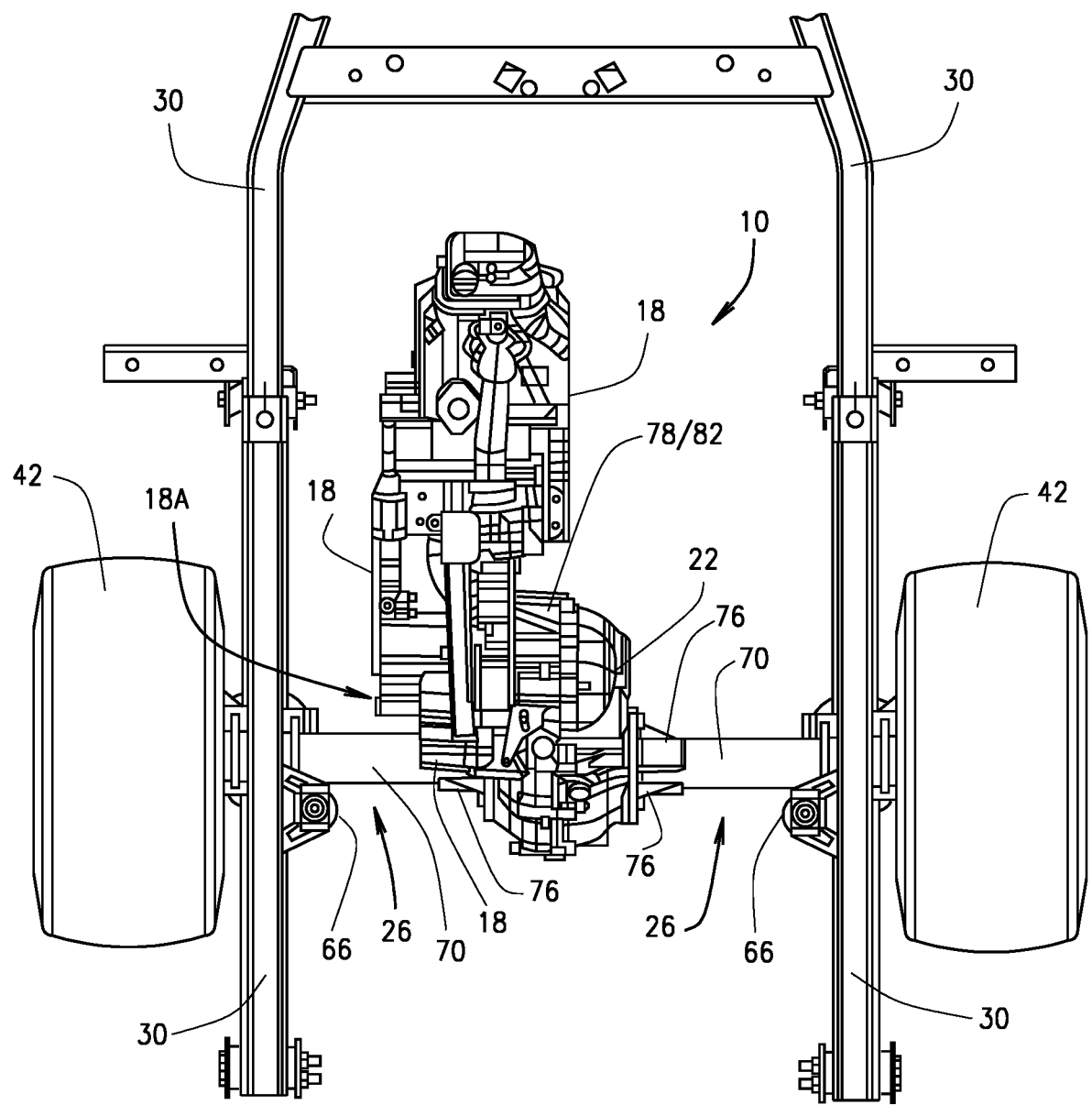
FIG. 2 is a top view of a portion of a vehicle chassis/frame having an axle assembly connected thereto to which the 'floating' powertrain is fixedly and operationally connected, in accordance with various embodiments of the present disclosure.
Figure 3:
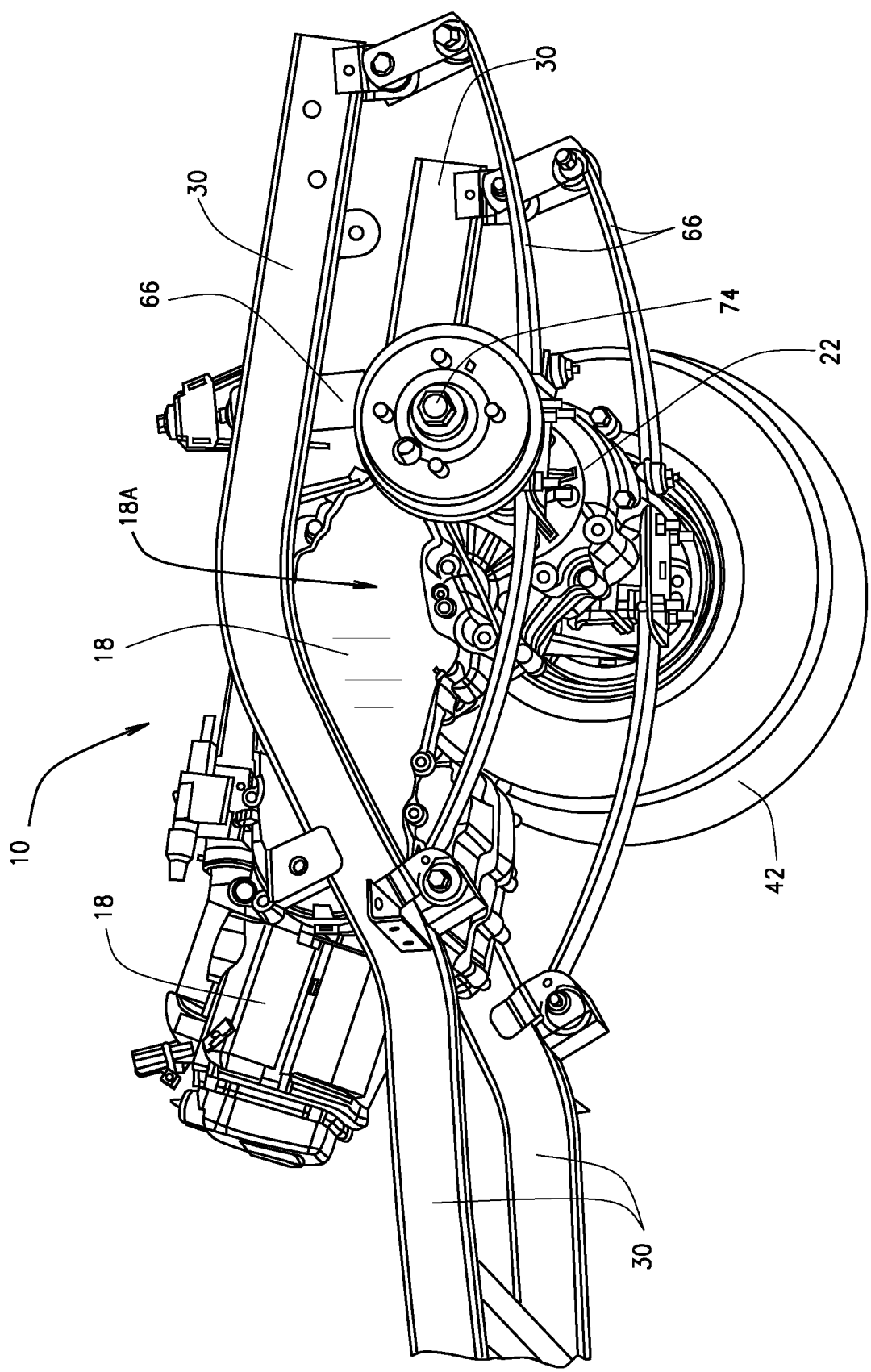
FIG. 3 is an isometric view showing the axle assembly connected the vehicle chassis/frame via only two or more suspension components (e.g., leaf springs and/or shocks) such that the 'floating' powertrain is operationally connected to the chassis/frame, and hence the respective vehicle, via only the suspension components, in accordance with various embodiments of the present disclosure.
Figure 4:
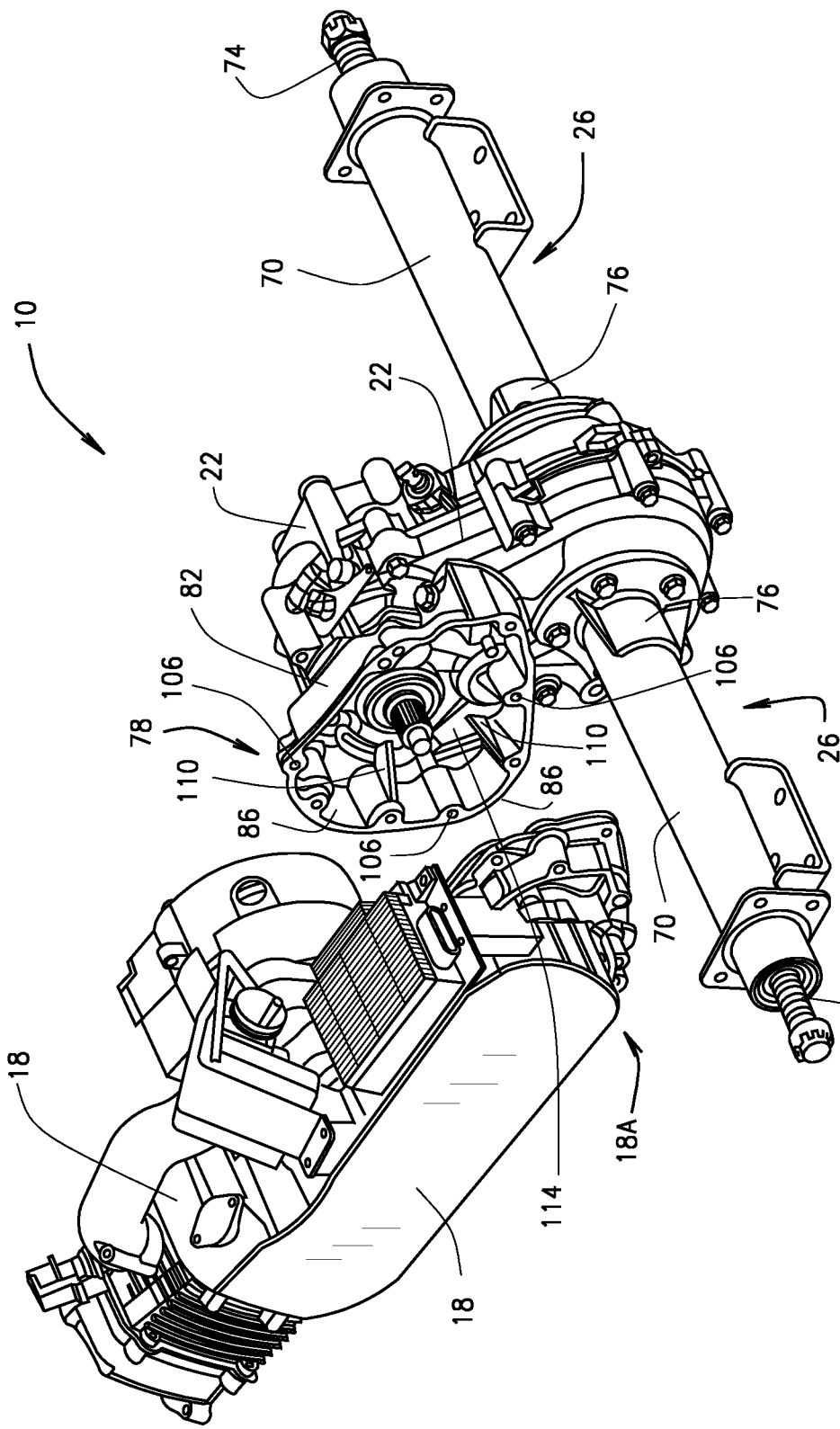
FIG. 4 is a partially exploded view of the 'floating' powertrain mounted to the axle assembly showing a transaxle mounting collar mounted to or integrally forms with the transaxle to which the prime mover can be mounted and cantilevered therefrom, in accordance with various embodiments of the present disclosure.
Figure 5:
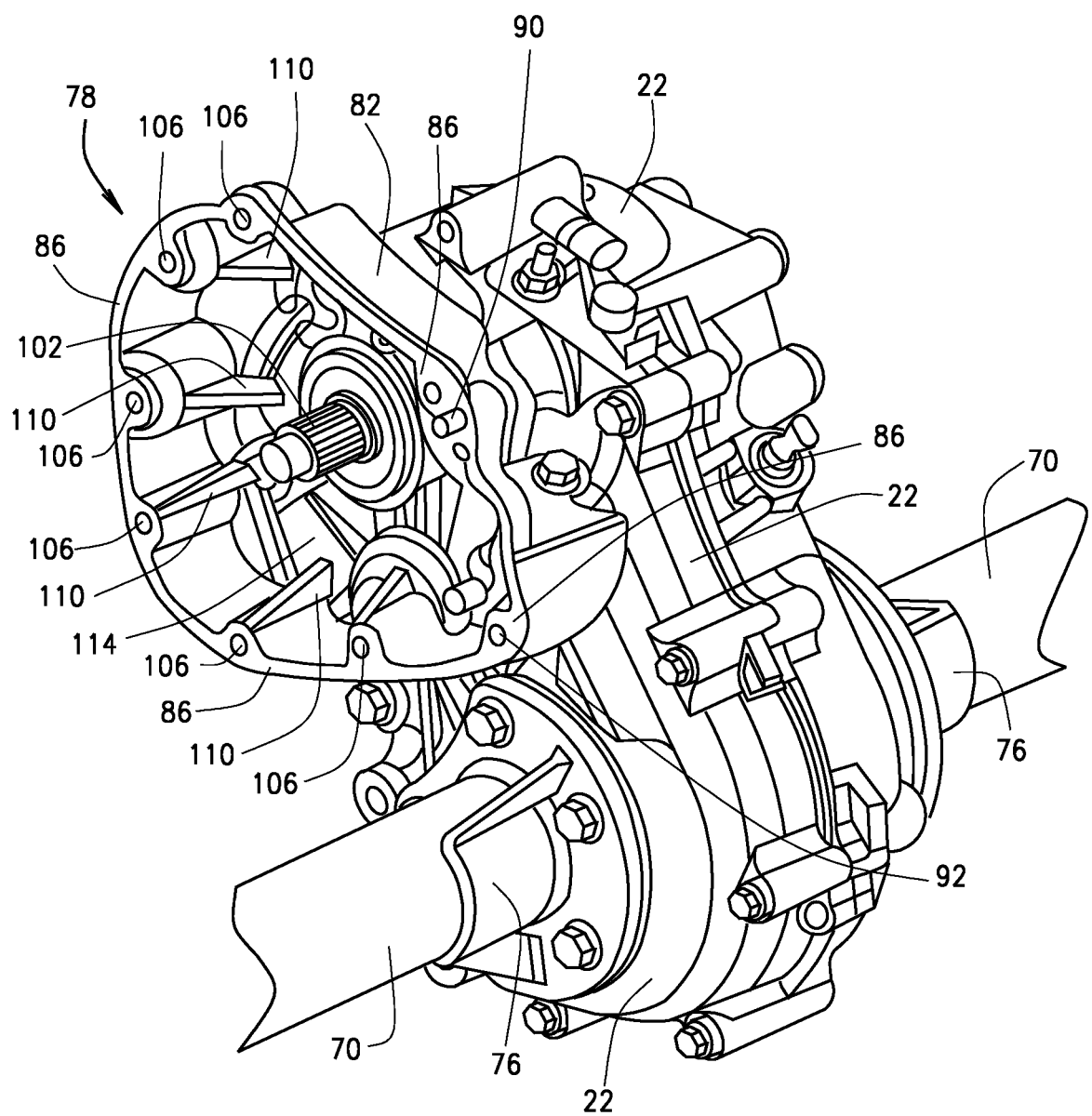
FIG. 5 is an isometric view of the transaxle and transaxle mounting collar, in accordance with various embodiments of the present disclosure.
Figure 6:
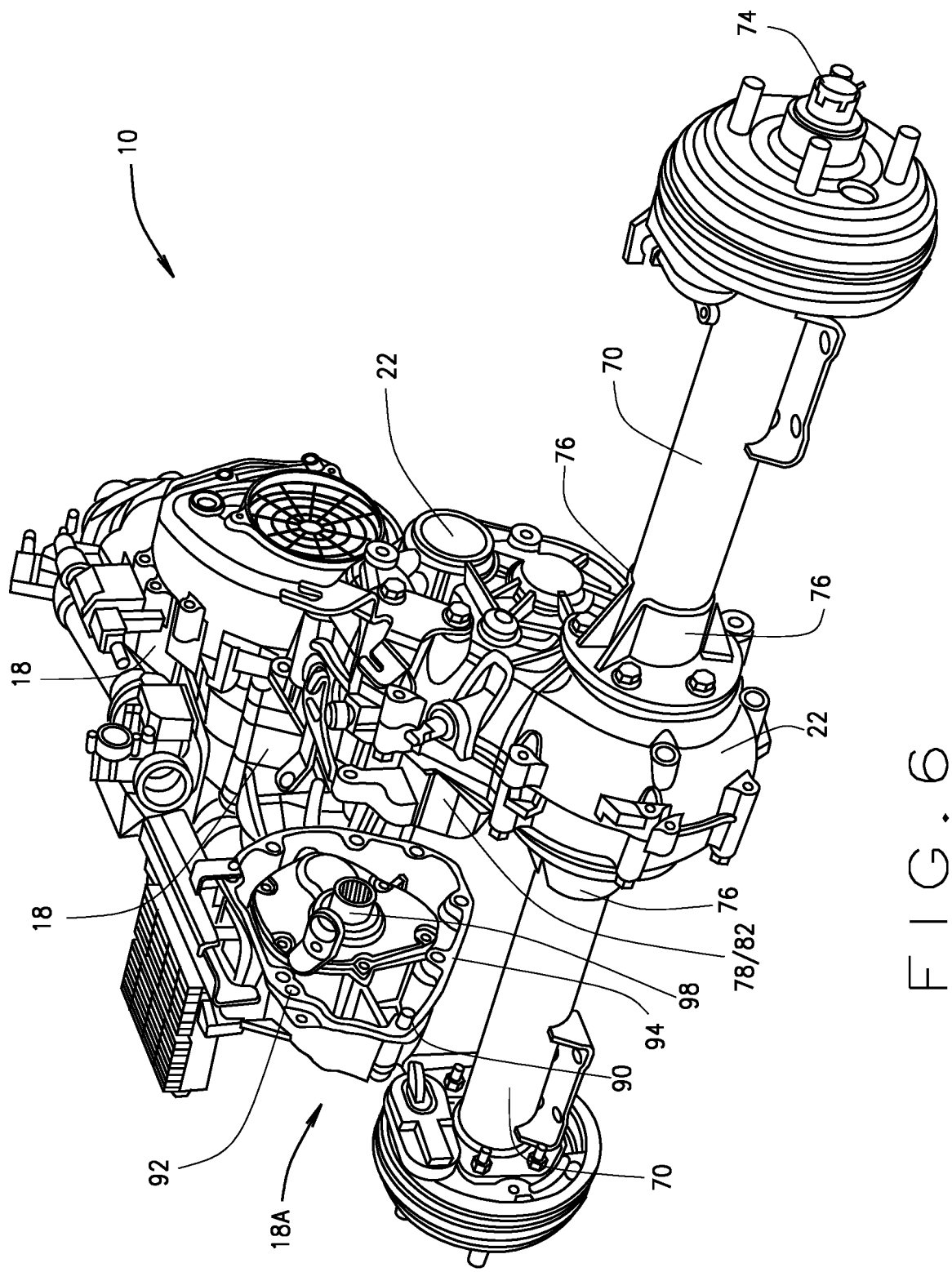
FIG. 6 is a partially exploded view of the 'floating' powertrain mounted to the axle assembly showing an output shaft of the prime mover, in accordance with various embodiments of the present disclosure.

Referring now to FIGS. 2, 3 and 4, as described above, the 'floating' powertrain 10 generally comprises the prime mover 18 that is fixedly mounted to and cantilevered from the transaxle 22 that is mounted only to the axle assembly 26 absent any other structure for connecting the transaxle 22, and hence the prime mover 18, to the vehicle 14. More specifically, the axle assembly 26 is connected to the chassis/frame 30 via two or more vehicle suspension components 66 (e.g., two or more springs (e.g., leaf springs, coil springs, etc.), and/or shocks, and/or struts, and/or spring/strut combinations, etc.). The suspension components 66 are mounted to one or more axle tube 70 of the axle assembly 26 and to the vehicle frame/chassis 30, thereby connecting the axle assembly 26 with the chassis/frame 30. The axle assembly 26 additionally includes one or more wheel axle 74 disposed within, and housed by, the axle tube(s) 70. The wheels (e.g., the front wheels 38 or the rear wheels 42) are mounted to distal ends of the wheel axle(s) 74. The transaxle 22 is fixedly mounted to the axle tube(s) 70 and operationally connected to the wheel axle(s) 74. In various embodiments, the transaxle 22 can be fixedly mounted to the axle tube(s) 70 via a plurality (e.g., 2 or more) mounting flanges 76.

The prime mover 18 is fixedly mounted to a transaxle mounting collar 78 that is connected to or integrally formed with the transaxle 22 (e.g., the mounting collar 78 is connected to or integrally formed with a housing of the transaxle 22). Other than the mounting collar 78 for connecting the prime mover 18 to the transaxle 22, there is no other support structure or means provided to connect and support the prime mover 18 to and within the vehicle 14. Specifically, the axle assembly 26 is connected to the chassis/frame 30 via the suspension components 66, the transaxle 22 is mounted to the axle tube(s) 70, the mounting collar 78 is connected to or integrally formed with the transaxle 22, and the prime mover 18 is mounted to the mounting collar 78 such that the prime mover 18 is cantilevered from (e.g., suspended from) the mounting collar 78. That is, the prime mover 18 is only operationally connected (e.g., indirectly connected) to the vehicle chassis/frame structure 30 (as best shown in FIGS. 2 and 3) through its connection and mounting to the transaxle 22 (via the mounting collar 78). Hence, the suspension components 66 provide the only elements, components, structure, or means by which the axle assembly 26, the transaxle 22 and ultimately the prime mover 18 are mounted to and within the vehicle 14, and thereby provide the only support torque path and vibration path for the 'floating' prime mover 18. The prime mover 18 is operationally connected to the transaxle 22 and the transaxle is operationally connected to the wheel axle(s) 74 such that operation of the prime mover 18 provides power and torque, via the transaxle 22, to the wheel axle(s) 74 to thereby provide motive power to the vehicle 17.

Referring now to FIGS. 3, 4, 5 and 6, as described above, the mounting collar 78 is structured and operable to connect or mount the prime mover 18 to the transaxle 22, which is mounted to the axle assembly 26. And, the axle assembly 26 is, in turn, connected or mounted to the chassis/frame 30 via the suspension components 62. Therefore, other than the connection of the axle assembly to the chassis/frame 30 via the suspension components 62, there is no other support structure or means provided to connect and support the prime mover 18 to and within the vehicle 14. Accordingly, that the prime mover 18 is cantilevered from (e.g., suspended from) the mounting collar 18, and the powertrain 10 (e.g., prime mover 18 plus the transaxle 22) is cantilevered from axle assembly 26 absent any structure for mounting the prime mover 18 to the vehicle 14—other than the suspension components 66.

The transaxle mounting collar 78 is sized, shaped, structured and operable to connected to a proximal end 18A of the prime mover 18 and thereby support and carry the load acting on the prime mover 18 as the prime mover 18 and vehicle 14 are operated. The load acting on the prime mover 18 will be readily and easily understood by one skilled in the art to comprise the weight and mass of the prime mover 18, torque generated by the prime mover 18 during operation thereof, the moment forces (e.g., force vectors), vibrations, jarring, jolting impacts, etc., acting on the prime mover 18 as the prime mover 18 and vehicle 14 are operated, and any other force acting on prime mover 18 or generated by the prime mover 18 that will be imparted on, translated to or transferred to the mounting collar 78 (and hence, on/to the transaxle 22, the axle assembly 26, and the suspension components 66) both when the prime mover 18 and/or vehicle 14 are in operation, and when the prime mover 18 and/or vehicle 14 are not operating or are stationary or at rest.

Specifically, the transaxle mounting collar 78 comprises a sidewall 82 having a mounting face 86 formed along a distal edge thereof (i.e., the edge of the sidewall 82 furthest away from the transaxle 22) to which the prime mover 18 can be mounted. As described further below, the mounting face 86 has a surface area sized and shaped to support the cantilevered prime mover 18, and bear the load(s) exerted thereby and thereon, absent any additional structure for mounting the prime mover 18 to the vehicle 14. Particularly, as one skilled in the art will readily and easily understand, the larger the surface area of the mounting face 86 to which prime mover 18 is mounted, the more the load(s) exerted by and on the prime mover 18 will be distributed across that surface area. Hence, the larger the surface area of the mounting face 86, the greater load(s) the mounting collar 78 will support and bear. Therefore, the size and shape of the surface area of the mounting face 86 (e.g., circumferential length, shape and width of the mounting face 86) is dependent on the size and weight/mass of the prime mover 18 and the load(s) generated by and acting on the prime mover 18.

The prime mover 18 comprises a mounting face 94 that contacts the mounting collar mounting face 86 when the prime mover 18 is mounted to the transaxle 22, via the mounting collar 78. In various embodiments, the prime mover 18 can be securely mounted to the mounting collar 78 using a plurality of bolts (not shown) inserted through a plurality of bolt holes or channels 106 formed in the mounting collar 78. Alternatively, in various embodiments, the prime mover 18 can be securely mounted to the mounting collar 78 using any other suitable connecting means, method, device or mechanism.

As described above, the surface area of the mounting face 86 is sized and shaped to distribute the weight/mass of the prime mover 18 and load(s) exerted by and on the prime mover 18 across that surface area such that the prime mover can be cantilevered from mounting collar 78, absent any additional structure for mounting the prime mover 18 to the vehicle 14. Particularly, the mounting face 86 is sized and shaped such that when the prime mover 18 is mounted to the mounting collar 78 substantially the entire surface area of the mounting collar mounting face 86 is in contact with at least substantially the entire surface area of the prime mover mount face 94 (and/or vice-versa). Therefore, sufficient contact surface area is provided between the mounting faces 86 and 94 to distribute the weight/mass of the cantilevered prime mover 18 and the load(s) exerted by and on the cantilevered prime mover 18 across the contact surface area. And therefore, sufficient support is provided for the cantilevered prime mover 18 and to bear the load(s) exerted by and on the prime mover 18 when the prime mover 18 and/or vehicle 14 are in operation, and when the prime mover 18 and/or vehicle 14 are not operating or are stationary or at rest. Said another way, the contact surface area between the mounting faces 86 and 94 is sized and shaped to provide the sufficient weight distribution of the prime mover within the respective design constraints. Additionally, the geometry of contact surface area between the mounting faces 86 and 94 provides an effective clamping load with significantly high margin of safety for the respective material used on the construction of the body of the prime mover 18 and the transaxle 22. For example, in various embodiments, the contact surface area between the mounting faces 86 and 94 can be between approximately 5000.0 mm$^2$ and 6500.0 mm$^2$ (e.g., approx. 5700.00 mm$^2$).

In various embodiments, to assist in supporting the prime mover 18 and bearing the load(s) generated by and exerted on the prime mover 18, the mounting collar 82 and/or the prime mover 18 can comprise at least one alignment pin 90 extending from at least one of the mounting collar mounting face 86 and a mounting face 94 of the prime mover 18. The alignment pin(s) 90 is/are located along the mounting collar mounting face 86 and/or prime mover mounting face 94 and are structured to mate with a corresponding alignment pin receptacle 92 disposed in the respective corresponding mounting collar mounting face 86 and/or prime mover mounting face 94. In addition to helping support the prime mover 18 and bearing the load(s) generated by and exerted on the prime mover 18 absent any additional structure for mounting the prime mover 18 to the vehicle 14, the alignment pin(s) 90 is/are structured and operable to align the mounting collar mounting face 86 and prime mover mounting face 94 with each other. More specifically, the alignment pin(s) 90 align the mounting collar and prime mover mounting faces 86 and 94 such that substantially the entire surface area of the mounting collar mounting face 86 is in contact with at least substantially the entire surface area of the prime mover mount face 94 (and/or vice-versa). Therefore, sufficient contact surface area is provided between the mounting faces 86 and 94 to distribute the weight/mass of the cantilevered prime mover 18 and the load(s) exerted by and on the prime mover 18 across the contact surface area. And therefore, sufficient support is provided for the cantilevered prime mover 18 and to bear the load(s) exerted by and on the prime mover 18 when the prime mover 18 and/or vehicle 14 are in operation, and when the prime mover 18 and/or vehicle 14 are not operating or are stationary or at rest.

Furthermore, in various embodiments, the alignment pin(s) 90 is/are structured and operable to coaxially align an output shaft 98 of the prime mover 18 with an input shaft 102 of the transaxle 22 such that the prime mover output shaft 98 can be coupled directly to the transaxle input shaft 102. More specifically the alignment pin(s) 90 is/are structured and operable to align the prime mover output shaft 98 with the transaxle input shaft 102 such that a longitudinal axis of the prime mover output shaft 98 will coaxially align with a longitudinal axis of the transaxle input shaft 102, thereby allowing the prime mover output shaft 98 and the transaxle input shaft 102 to be directly connected to each other. For example, in various instances, one of the prime mover output shaft 98 or the transaxle input shaft 102 can be a hollow shaft with splined interior (exemplarily shown in the figures to be the prime mover output shaft 98) and the respective other prime mover output shaft 98 or the transaxle input shaft 102 can be a solid shaft with a splined exterior (exemplarily shown in the figures to be the transaxle input shaft 102), such that prime mover output shaft 98 can directly connect and mate with the transaxle input shaft 102 in a splined interconnection.

In various embodiments, the mounting collar 78 can further comprises a plurality of gussets 110 formed along an interior surface of the sidewall 82. The gussets 110 are structured and operable to add strength to the sidewall 82 such that the mounting collar 78 will support the cantilevered prime mover 18 and bear the load(s) exerted by and on the prime mover 18 when the prime mover 18 and/or vehicle 14 are in operation, and when the prime mover 18 and/or vehicle 14 are not operating or are stationary or at rest. In various instances, the gussets 110 can be triangular structures that are connected or integrally formed between the interior surface of the sidewall 82 and the interior surface of a base 114 of the mounting collar 78. The gussets 110 provide support to the sidewall 78 and help reduce or prevent flexure of sidewall 78 caused by the weight/mass of the cantilevered prime mover 18 and/or the load(s) exerted by and on the prime mover 18.

In various embodiments, the prime mover 18 is structured and designed to locate the center of gravity of the prime mover 18 a desired distance from the transaxle 22 and the ground in order to aid the mounting collar 78 in supporting the load(s) generated by and acting on the prime mover 18 such that the prime mover 18 can be cantilevered from the transaxle 22. More particularly, the prime mover 18 is structured and designed to have a length, height, width and weight/mass designed to locate the center of gravity of the prime mover 18 a desired distance from the transaxle 22 and the ground that allows the mounting collar 78 to support the load(s) generated by and acting on the prime mover 18 such that the prime mover 18 can be cantilevered from the transaxle 22. In various embodiments, the overall size of the prime mover 18 is designed to be smaller than known prime movers (e.g., internal combustion engines) known to be used in various lightweight vehicles (e.g., golf cars). For example, in various instances, the prime mover 18 is designed to be between 15%-30% (e.g., 22%) smaller than known prime movers known to be used in various lightweight vehicles. The reduction in the length of the prime mover 18 locates the center of gravity (CG) of the prime mover 18 closer to the longitudinal center axis P of the axle shaft 74, thereby reducing the overhang mass, and hence, the rotational moment of the powertrain 10. In various instances where the powertrain 10 includes a transmission (as described below with regard to FIGS. 7 and/or 8) the reduction in size of the prime mover 18 additionally requires that the design of the transmission 118 and/or 118' be reduced with regard to known transmissions, thereby further reducing the mass of the powertrain 10. For example, as exemplarily shown in FIG. 8, in various embodiments, the CG of the powertrain 10 can be located, as measured from the longitudinal center axis P of the axle shaft 74, between approximately 45.0 mm and 60.0 mm (e.g., approx. 51.0 mm) in the Z direction vertically above the axis P, between approximately 165.0 mm and 180.0 mm (e.g., approx. 171.0 mm) in the X direction forward of/in front of the axle P, and between approximately 45.0 mm and 60.0 mm (e.g., approx. 53.0 mm) in the Y direction along the axis P toward the driver's side end of the axle shaft 74 from the vehicle center toward the driver side.

Figure 7:
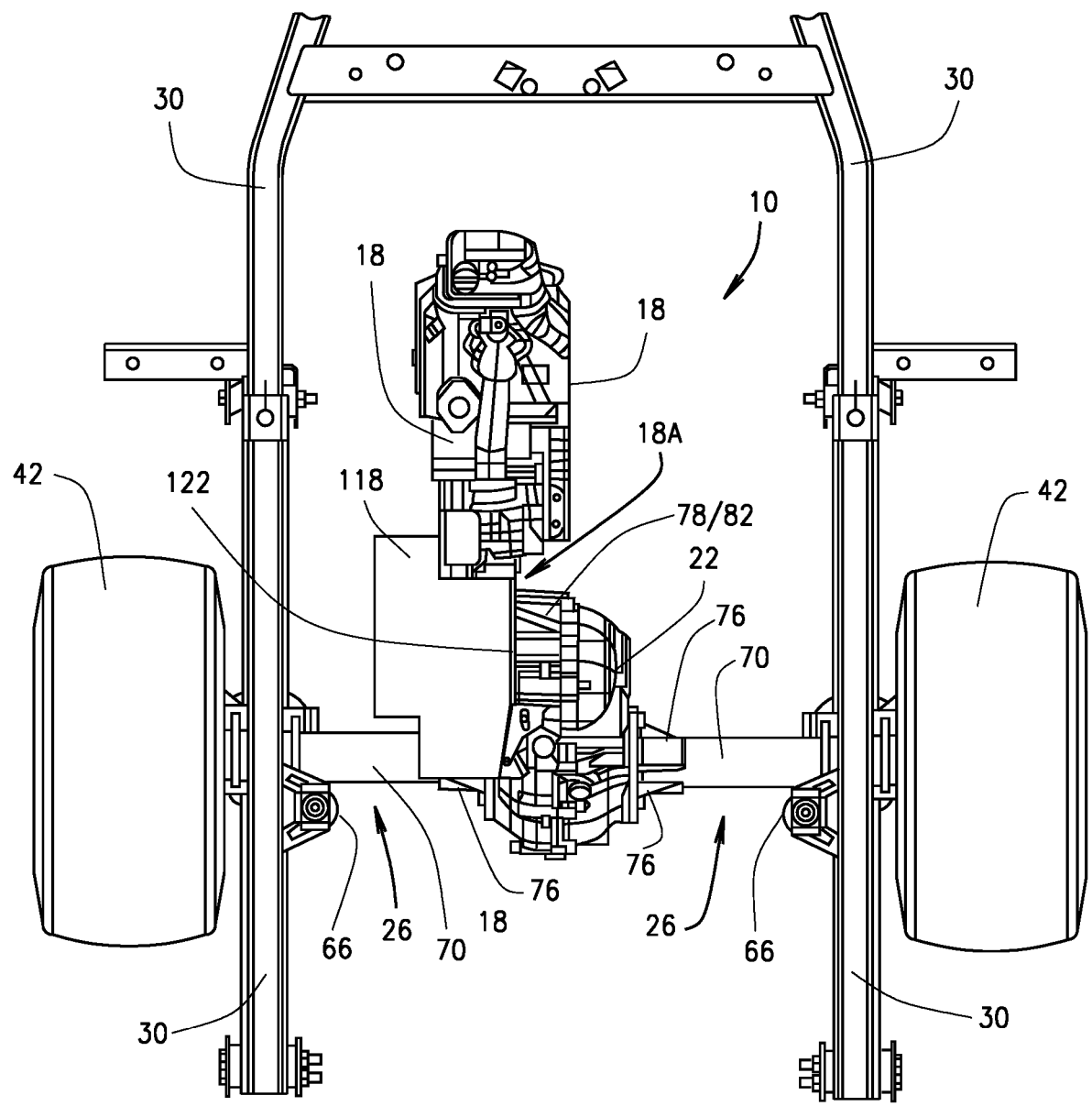
FIG. 7 is a partially exploded view of the 'floating' powertrain mounted to the axle assembly including a transmission, in accordance with various embodiments of the present disclosure.

Referring now to FIG. 7, in various embodiments, the 'floating' powertrain 10 can further comprise a transmission 118 that is fixedly and operationally connected to the prime mover 18 and to the transaxle mounting collar 78 absent any additional structure for mounting the transmission 118 to the vehicle 14. More specifically, the transmission 118 is connected to the prime mover 18 and receives power (e.g., torque) output by the prime mover 18. The transmission 118 in turn transfers the power delivered from the prime mover 18 to the transaxle 22, which in turn deliver the power as motive force to the axle assembly 26 and wheel (e.g., rear wheels 42) In various instances, the transmission 118 can comprise a plurality of gears (not show) that are interoperatively connected to controllably provide various gear ratios that adjust (e.g., increase or decrease) the power delivered to the transaxle 22. In various other instances, the transmission 118 can comprise a continuously-variable-transmission (CVT) that delivers the power to transaxle 22 through a continuous range of gear ratios via a system of pulleys and belts.

In such embodiments, the transmission 118 comprises a mounting face 122 that is similar to the prime mover mounting face 94 described above, for mounting the transmission 118 to transaxle mounting collar 78. More particularly, the transmission 118 mounts to the mounting collar 78 in the same manner as described above with regard to the prime mover 18. Specifically, the transmission mounting face 122 contacts the mounting collar mounting face 86 when the transmission 118 is mounted to the mounting collar 78. The surface area of the mounting collar mounting face 86 is sized and shaped to distribute the weight/mass of the prime mover 18 and the transmission 118, and the load(s) exerted by and on the prime mover 18 and transmission 118 across that surface area such that the prime mover 18 and transmission 118 can be cantilevered from mounting collar 78, absent any additional structure for mounting the prime mover 18 and/or transmission 118 to the vehicle 14. Particularly, the mounting face 86 is sized and shaped such that when the transmission 118 is mounted to the mounting collar 78 substantially the entire surface area of the mounting collar mounting face 86 is in contact with at least substantially the entire surface area of the transmission mount face 122 (and/or vice-versa).

Therefore, sufficient contact surface area is provided between the mounting faces 86 and 122 to distribute the weight/mass of the cantilevered prime mover 18 and transmission 118 and the load(s) exerted by and on the cantilevered prime mover 18 and transmission 118 across the contact surface area. And therefore, sufficient support is provided for the cantilevered prime mover 18 and transmission 118, and to bear the load(s) exerted by and on the prime mover 18 and transmission 118 when the prime mover 18 and/or transmission 118 and/or vehicle 14 are in operation, and when the prime mover 18 and/or transmission 118 and/or vehicle 14 are not operating or are stationary or at rest. Therefore, the size and shape of the surface area of the mounting face 86 (e.g., circumferential length and width of the mounting face 86) is dependent on the size and weight/mass of the prime mover 18 and transmission 118 and the load(s) generated by and acting on the prime mover 18 and transmission 118. As described above, the contact surface area between the mounting faces 86 and 94 is sized and shaped to provide the sufficient weight distribution of the prime mover within the respective design constraints. Additionally, the geometry of contact surface area between the mounting faces 86 and 94 provides an effective clamping load with significantly high margin of safety for the respective material used on the construction of the body of the prime mover 18 and the transaxle 22. For example, in various embodiments, the contact surface area between the mounting faces 86 and 94 can be between approximately 5000.0 mm$^2$ and 6500.0 mm$^2$ (e.g., approx. 5700.00 mm$^2$).

Furthermore, in such embodiments, the transmission 18 can comprise at least one alignment pin 90 (not shown) extending from the transmission mounting face 122. Similar to the description above with regard to FIGS. 4, 5 and 6, the alignment pin(s) 90 is/are located along the mounting collar mounting face 86 and/or transmission mounting face 122 and are structured to mate with a corresponding alignment pin receptacle 92 (not shown) disposed in the respective corresponding mounting collar mounting face 86 and/or transmission mounting face 122. In addition to helping support the prime mover 18 and transmission 118 and bearing the load(s) generated by and exerted on the prime mover 18 and transmission 118 absent any additional structure for mounting the prime mover 18 and transmission 118 to the vehicle 14, the alignment pin(s) 90 is/are structured and operable to align the mounting collar mounting face 86 and transmission mounting face 122 with each other. More specifically, the alignment pin(s) 90 align the mounting collar and transmission mounting faces 86 and 122 such that substantially the entire surface area of the mounting collar mounting face 86 is in contact with at least substantially the entire surface area of the transmission mount face 122 (and/or vice-versa). Therefore, sufficient contact surface area is provided between the mounting faces 86 and 122 to distribute the weight/mass of the cantilevered prime mover 18 and transmission 122, and the load(s) exerted by and on the prime mover 18 and transmission 122 across the contact surface area. And therefore, sufficient support is provided for the cantilevered prime mover 18 and transmission 122 and to bear the load(s) exerted by and on the prime mover 18 and transmission 118 when the prime mover 18 and/or transmission 118 and/or vehicle 14 are in operation, and when the prime mover 18 and/or transmission 118 and/or vehicle 14 are not operating or are stationary or at rest.

Additionally, in various embodiments, the alignment pin(s) 90 is/are structured and operable to coaxially align an output shaft (not shown) of the transmission 118 with an input shaft 102 of the transaxle 22 such that the transmission output shaft can be coupled directly to the transaxle input shaft 102. More specifically the alignment pin(s) 90 is/are structured and operable to align the transmission output shaft with the transaxle input shaft 102 such that a longitudinal axis of the transmission output shaft will coaxially align with a longitudinal axis of the transaxle input shaft 102, thereby allowing the transmission output shaft 98 and the transaxle input shaft 102 to be directly connected to each other. For example, in various instances, one of the transmission output shaft or the transaxle input shaft 102 can be a hollow shaft with splined interior and the respective other transmission output shaft or the transaxle input shaft 102 can be a solid shaft with a splined exterior, such that transmission output shaft can directly connect and mate with the transaxle input shaft 102 in a splined interconnection.

In various embodiments, the prime mover 18 and transmission 118 are structured and designed to locate the center of gravity of the prime mover 18 and transmission 118 a desired distance from the transaxle 22 and the ground in order to aid the mounting collar 78 in supporting the load(s) generated by and acting on the prime mover 18 and transmission 118 such that the prime mover 18 and transmission 118 can be cantilevered from the transaxle 22. More particularly, the prime mover 18 and transmission 118 are structured and designed to have a combined length, height, width and weight/mass designed to locate the center of gravity of the prime mover 18 and transmission 118 a desired distance from the transaxle 22 and the ground that allows the mounting collar 78 to support the load(s) generated by and acting on the prime mover 18 and transmission 118 such that the prime mover 18 and transmission 118 can be cantilevered from the transaxle 22. As described above, in various embodiments, the overall size of the prime mover 18 is designed to be smaller than known prime movers (e.g., internal combustion engines) known to be used in various lightweight vehicles (e.g., golf cars). For example, in various instances, the prime mover 18 is designed to be between 15%-30% (e.g., 22%) smaller than known prime movers known to be used in various lightweight vehicles. The reduction in the length of the prime mover 18 locates the center of gravity (CG) of the prime mover 18 closer to the longitudinal center axis P of the axle shaft 74, thereby reducing the overhang mass, and hence, the rotational moment of the powertrain 10. In various instances where the powertrain 10 includes a transmission (as described below with regard to FIGS. 7 and/or 8) the reduction in size of the prime mover 18 additionally requires that the design of the transmission 118 and/or 118' be reduced with regard to known transmissions, thereby further reducing the mass of the powertrain 10. For example, as exemplarily shown in FIG. 8, in various embodiments, the CG of the powertrain 10 can be located, as measured from the longitudinal center axis P of the axle shaft 74, between approximately 45.0 mm and 60.0 mm (e.g., approx. 51.0 mm) in the Z direction vertically above the axis P, between approximately 165.0 mm and 180.0 mm (e.g., approx. 171.0 mm) in the X direction forward of/in front of the axle P, and between approximately 45.0 mm and 60.0 mm (e.g., approx. 53.0 mm) in the Y direction along the axis P toward the driver's side end of the axle shaft 74 from the vehicle center toward the driver side.

Figure 8:
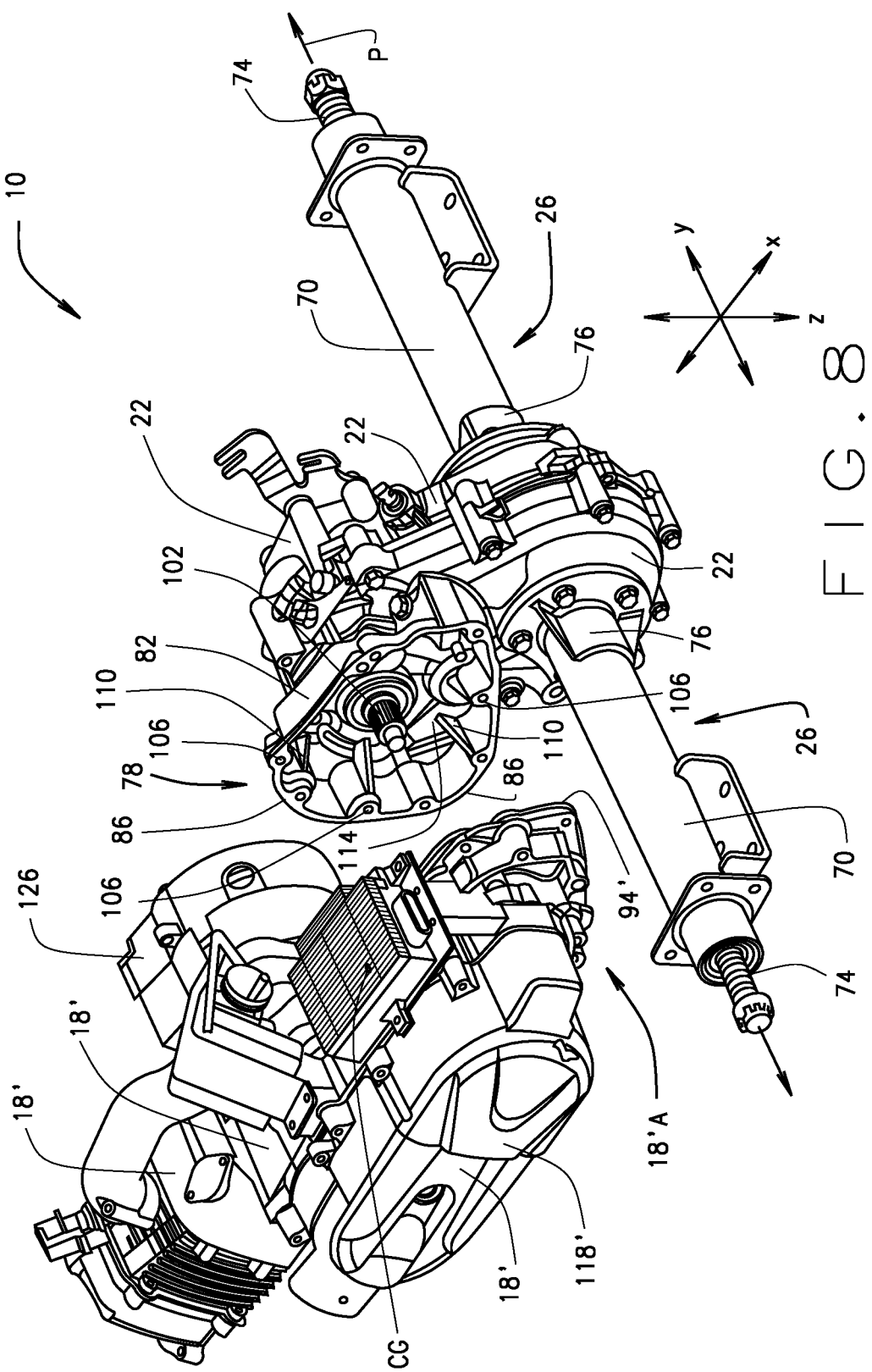
FIG. 8 is a partially exploded view of the 'floating' powertrain mounted to the axle assembly comprising an integrated prime mover-transmission comprising the prime mover integrated with a transmission in accordance with various embodiments of the present disclosure.

Referring now to FIG. 8, in various embodiments, the 'floating' powertrain 10 can comprise an integrated prime mover-transmission unit 18' that comprises a prime mover integrated and integrally fabricated with a transmission 118' to provide a single unit or component of the 'floating' powertrain 10. The prime mover-transmission unit 18' is fixedly connected to the transaxle mounting collar 78 absent any additional structure for mounting the prime mover-transmission unit 18' to the vehicle 14. The prime mover-transmission unit 18' is structured and operable to generate power (e.g., torque) via the prime mover portion of the prime mover-transmission unit 18', and to controllably adjust (e.g., increases and/or decreases) and deliver the power generated to the transaxle 22 via the transmission portion of the prime mover-transmission unit 18'. The transaxle 22 in turn delivers the power as motive force to the axle assembly 26 and wheel (e.g., rear wheels 42) In various instances, the transmission portion of the prime mover-transmission unit 18' can comprise a plurality of gears (not show) that are interoperatively connected to controllably provide various gear ratios that adjust (e.g., increase or decrease) the power delivered to the transaxle 22. In various other instances, the transmission portion 118' of the prime mover-transmission unit 18' can comprise a continuously-variable-transmission (CVT) that delivers the power to transaxle 22 through a continuous range of gear ratios via a system of pulleys and belts.

The prime mover-transmission unit 18' comprises a mounting face 94' at a distal end 18'A that is similar to the prime mover mounting face 94 described above, for mounting the prime mover-transmission unit 18' to transaxle mounting collar 78. More particularly, the prime mover-transmission unit 18' mounts to the mounting collar 78 in the same manner as described above with regard to the prime mover 18. Specifically, the prime mover-transmission unit 18' mounting face 94' contacts the mounting collar mounting face 86 when the prime mover-transmission unit 18' is mounted to the mounting collar 78. The surface area of the mounting collar mounting face 86 is sized and shaped to distribute the weight/mass of the prime mover-transmission unit 18', and the load(s) exerted by and on the prime mover-transmission unit 18' across that surface area such that the prime mover-transmission unit 18' can be cantilevered from mounting collar 78, absent any additional structure for mounting the prime mover-transmission unit 18' to the vehicle 14. Particularly, the mounting face 86 is sized and shaped such that when the prime mover-transmission unit 18' is mounted to the mounting collar 78 substantially the entire surface area of the mounting collar mounting face 86 is in contact with at least substantially the entire surface area of the prime mover-transmission unit mount face 94' (and/or vice-versa).

Therefore, sufficient contact surface area is provided between the mounting faces 86 and 94' to distribute the weight/mass of the cantilevered prime mover-transmission unit 18' and the load(s) exerted by and on the cantilevered prime mover-transmission unit 18' across the contact surface area. And therefore, sufficient support is provided for the cantilevered prime mover-transmission unit 18', and to bear the load(s) exerted by and on the prime mover-transmission unit 18' when the prime mover-transmission unit 18' and/or vehicle 14 are in operation, and when the prime mover-transmission unit 18' and/or vehicle 14 are not operating or are stationary or at rest. Therefore, the size and shape of the surface area of the mounting face 86 (e.g., circumferential length and width of the mounting face 86) is dependent on the size and weight/mass of the and bear the load(s) exerted by and on the prime and the load(s) generated by and acting on the and bear the load(s) exerted by and on the prime. As described above, in various embodiments the contact surface area between the mounting faces 86 and 94 is sized and shaped to provide the sufficient weight distribution of the prime mover within the respective design constraints. Additionally, the geometry of contact surface area between the mounting faces 86 and 94 provides an effective clamping load with significantly high margin of safety for the respective material used on the construction of the body of the prime mover 18 and the transaxle 22. For example, in various embodiments, the contact surface area between the mounting faces 86 and 94 can be between approximately 5000.0 mm$^2$ and 6500.0 mm$^2$ (e.g., approx. 5700.00 mm$^2$).

Furthermore, in such embodiments, the prime mover-transmission unit 18' can comprise at least one alignment pin 90 (not shown) extending from the prime mover-transmission unit mounting face 94'. Similar to the description above with regard to FIGS. 4, 5 and 6, the alignment pin(s) 90 is/are located along the mounting collar mounting face 86 and/or prime mover-transmission unit mounting face 94' and are structured to mate with a corresponding alignment pin receptacle 92 (not shown) disposed in the respective corresponding mounting collar mounting face 86 and/or prime mover-transmission unit mounting face 94'. In addition to helping support the prime mover-transmission unit 18' and bearing the load(s) generated by and exerted on the prime mover-transmission unit 18' absent any additional structure for mounting the prime mover-transmission unit 18' to the vehicle 14, the alignment pin(s) 90 is/are structured and operable to align the mounting collar mounting face 86 and prime mover-transmission unit mounting face 94' with each other. More specifically, the alignment pin(s) 90 align the mounting collar and prime mover-transmission unit mounting faces 86 and 94' such that substantially the entire surface area of the mounting collar mounting face 86 is in contact with at least substantially the entire surface area of the prime mover-transmission unit mount face 94' (and/or vice-versa). Therefore, sufficient contact surface area is provided between the mounting faces 86 and 94' to distribute the weight/mass of the cantilevered prime mover-transmission unit 18', and the load(s) exerted by and on the prime mover-transmission unit 18' across the contact surface area. And therefore sufficient support is provided for the cantilevered prime mover-transmission unit 18' and to bear the load(s) exerted by and on the prime mover-transmission unit 18' when the prime mover-transmission unit 18' and/or vehicle 14 are in operation, and when the prime mover-transmission unit 18' and/or vehicle 14 are not operating or are stationary or at rest.

Additionally, in various embodiments, the alignment pin(s) 90 is/are structured and operable to align an output shaft (not shown) of the prime mover-transmission unit 18' with an input shaft 102 of the transaxle 22 such that the prime mover-transmission unit output shaft can be coupled directly to the transaxle input shaft 102. More specifically the alignment pin(s) 90 is/are structured and operable to align the mover-transmission unit output shaft with the transaxle input shaft 102 such that a longitudinal axis of the mover-transmission unit output shaft will coaxially align with a longitudinal axis of the transaxle input shaft 102, thereby allowing the mover-transmission unit output shaft and the transaxle input shaft 102 to be directly connected to each other. For example, in various instances, one of the prime mover-transmission unit output shaft or the transaxle input shaft 102 can be a hollow shaft with splined interior and the respective other prime mover-transmission unit output shaft or the transaxle input shaft 102 can be a solid shaft with a splined exterior, such that prime mover-transmission unit output shaft can directly connect and mate with the transaxle input shaft 102 in a splined interconnection.

In various embodiments, the prime mover-transmission unit 18' is structured and designed to locate the center of gravity of the prime mover-transmission unit 18' a desired distance from the transaxle 22 and the ground in order to aid the mounting collar 78 in supporting the load(s) generated by and acting on the prime mover-transmission unit 18' such that the prime mover-transmission unit 18' can be cantilevered from the transaxle 22. More particularly, the prime mover-transmission unit 18' is structured and designed to have a length, height, width and weight/mass designed to locate the center of gravity of the prime mover-transmission unit 18' a desired distance from the transaxle 22 and the ground that allows the mounting collar 78 to support the load(s) generated by and acting on the prime mover-transmission unit 18' such that the prime mover-transmission unit 18' can be cantilevered from the transaxle 22. As described above, in various embodiments, the overall size of the prime mover 18 is designed to be smaller than known prime movers (e.g., internal combustion engines) known to be used in various lightweight vehicles (e.g., golf cars). For example, in various instances, the prime mover 18 is designed to be between 15%-30% (e.g., 22%) smaller than known prime movers known to be used in various lightweight vehicles. The reduction in the length of the prime mover 18 locates the center of gravity (CG) of the prime mover 18 closer to the longitudinal center axis P of the axle shaft 74, thereby reducing the overhang mass, and hence, the rotational moment of the powertrain 10. In various instances where the powertrain 10 includes a transmission (as described below with regard to FIGS. 7 and/or 8) the reduction in size of the prime mover 18 additionally requires that the design of the transmission 118 and/or 118' be reduced with regard to known transmissions, thereby further reducing the mass of the powertrain 10. For example, as exemplarily shown in FIG. 8, in various embodiments, the CG of the powertrain 10 can be located, as measured from the longitudinal center axis P of the axle shaft 74, between approximately 45.0 mm and 60.0 mm (e.g., approx. 51.0 mm) in the Z direction vertically above the axis P, between approximately 165.0 mm and 180.0 mm (e.g., approx. 171.0 mm) in the X direction forward of/in front of the axle P, and between approximately 45.0 mm and 60.0 mm (e.g., approx. 53.0 mm) in the Y direction along the axis P toward the driver's side end of the axle shaft 74 from the vehicle center toward the driver side.

Figure 9:
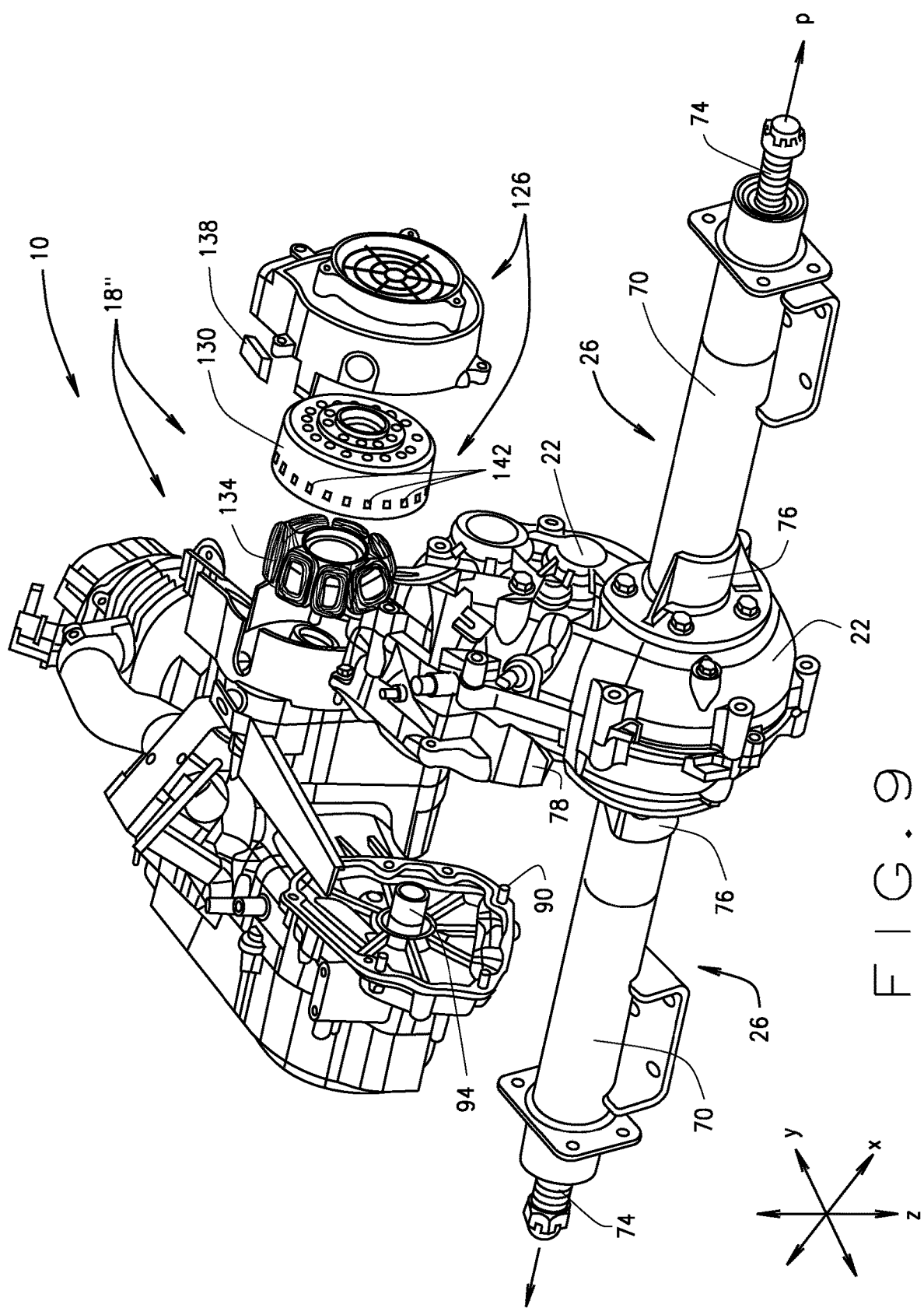
FIG. 9 is a partially exploded view of the 'floating' powertrain mounted to the axle assembly comprising an integrated prime mover-starter motor comprising the prime mover integrated with a starter motor, in accordance with various embodiments of the present disclosure.

Referring now to FIGS. 8 and 9, in various embodiments, the 'floating' powertrain 10 can comprise an integrated prime mover-starter generator 18" that comprises a prime mover integrated and integrally fabricated with a starter generator 126 to provide a single unit or component of the 'floating' powertrain 10. The starter generator 126 of the integrated prime mover-starter generator 18" generally comprises a rotor 130, a stator or field coil 134, and a Hall effect position sensor 138, and a fan (not shown). In various instances the rotor 130 is structured as a drum and functions as a fly wheel and includes a plurality of permanent magnets sectors 142 disposed around a sidewall thereof. The center of the drum has a mounting hub to assemble it directly on the crank shaft. The stator 134 comprises a magnetic coil winding and is mounted on or to the engine. The Hall effect sensor identifies the position of the rotor, which is critical to avoid roll backs by repositioning the crank shaft for quick start. In various instances, in addition to turning the engine to start the engine, the integrated prime mover-starter generator 18" is structured and operable to generate 3-Phase AC electrical power that can be u electrical power usable for various vehicle utility requirements. In various instances, the integrated prime mover-starter generator 18" is structured and operable to be a non-contact compact assembly that integrates the rotor 134 into a crank shaft assembly of the engine while the stator or field coil is mounted to an engine casting and encapsulated by the rotor 134, which acts as fly wheel as well. The integrated prime mover-starter generator 18" is a maintenance free system with no serviceable parts in the assembly thereof and is structured to has few or no mechanical noise sources.

In further embodiments, the 'floating' powertrain 10 can comprise integrated prime mover-transmission-starter generator by combining features, function, structure and operation of the integrated prime mover-transmission unit 18' with the integrated prime mover-starter generator 18".

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A vehicle transaxle, said transaxle comprising:
 a plurality of mounting flanges fixedly mountable to at least one axle tube of the vehicle absent any additional structure for mounting the transaxle to the vehicle, the at least one axle tube housing at least one wheel axle, the transaxle operably couplable to the at least one wheel axle; and
 a transaxle mounting collar that is one of fixedly mounted to or integrally formed with a housing of the transaxle, the transaxle mounting collar structured and operable to have a prime mover of the vehicle mounted thereto and to support a weight of the prime mover such that the prime mover is mountable to the vehicle via the mounting collar absent any additional structure for mounting the prime mover to the vehicle such that the prime mover can be cantilevered from the transaxle.

2. The transaxle of claim 1, wherein the transaxle mounting collar comprises a sidewall having a mounting face formed along a distal edge of the sidewall to which the prime mover is mountable, the mounting face having a surface area sized and shaped to support the prime mover absent any additional structure for mounting the prime mover to the vehicle such that the prime mover can be cantilevered from the transaxle.

3. The transaxle of claim 2, further comprising at least one alignment pin extending from transaxle mounting collar mounting face, the at least one alignment pin structured and operable to:
 align an output shaft of the prime mover to an input shaft of the transaxle such that the prime mover output shaft can be coupled directly to the transaxle input shaft, and support the prime mover absent any additional structure for mounting the prime mover to the vehicle such that the prime mover can be cantilevered from the transaxle.

4. The transaxle of claim 2, wherein the transaxle mounting collar further comprises a plurality of gussets formed along the transaxle mounting collar sidewall and structured and operable to support the prime mover absent any additional structure for mounting the prime mover to the vehicle such that the prime mover can be cantilevered from the transaxle.

5. A vehicle powertrain, said powertrain comprising:
a drive axle assembly, the drive axle assembly comprising:
at least one wheel axle; and
at least one axle tube housing the at least one wheel axle, the at least one axle tube connectable to a pair of vehicle suspension components that are connectable to a chassis of the vehicle such that the at least one axle tube is operably connectable to the vehicle chassis via the vehicle suspension components;
a transaxle operably coupled to the at least one wheel axle and fixedly mounted to the at least one axle tube absent any additional structure for mounting the transaxle to the vehicle;
a transaxle mounting collar that is one of fixedly mounted to or integrally formed with a housing of the transaxle; and
a prime mover operably coupled to the transaxle and fixedly mounted to the transaxle mounting collar absent any additional structure for mounting the prime mover to the vehicle such that the prime mover is cantilevered from the transaxle.

6. The powertrain of claim 5, wherein an output shaft of the prime mover is coupled directly to an input shaft of the transaxle.

7. The powertrain of claim 5 further comprising a transmission fixedly connected to the prime mover and the transaxle mounting collar absent any additional structure for mounting the transmission to the vehicle such that prime mover is operably coupled to the transaxle, via the transmission.

8. The powertrain of claim 5, wherein the prime mover comprises an integrated prime mover-transmission unit having a transmission integrated with the prime mover, and the prime mover-transmission unit is operably coupled to the transaxle and fixedly mounted to the transaxle mounting collar absent any additional structure for mounting the prime mover-transmission unit to the vehicle such that the prime mover-transmission unit is cantilevered from the transaxle.

9. The powertrain of claim 8, wherein an output shaft of the prime mover-transmission unit is coupled directly to an input shaft of the transaxle.

10. The powertrain of claim 5, wherein the transaxle mounting collar comprises a sidewall having a mounting face formed along a distal edge of the sidewall to which the prime mover can be mounted, the mounting face having a surface area sized and shaped to support the prime mover absent any additional structure for mounting the prime mover to the vehicle such that the prime mover is cantilevered from the transaxle.

11. The powertrain of claim 10, further comprising at least one alignment pin extending from at least one of the prime mover mounting face and a mounting face of the prime mover, the at least one alignment pin structured and operable to:
align an output shaft of the prime mover to an input shaft of the transaxle such that the prime mover output shaft is coupled directly to the transaxle input shaft, and
support the prime mover absent any additional structure for mounting the prime mover to the vehicle such that the prime mover is cantilevered from the transaxle.

12. The powertrain of claim 11, wherein the transaxle mounting collar further comprises a plurality of gussets structured and operable to support the prime mover absent any additional structure for mounting the prime mover to the vehicle such that the prime mover is cantilevered from the transaxle.

13. A vehicle, said vehicle comprising:
a chassis;
a pair of vehicle suspension components connected to the chassis; and
a powertrain mounted to the chassis via the suspension components absent any additional structure for mounting the powertrain to the vehicle, the powertrain comprising:
a drive axle assembly, the drive axle assembly comprising:
at least one wheel axle; and
at least one axle tube housing the at least one wheel axle, the at least one axle tube connected to the suspension components such that the at least one axle tube is operably connectable to the vehicle chassis via the vehicle suspension components;
a transaxle operably coupled to the at least one wheel axle and fixedly mounted to the at least one axle tube absent any additional structure for mounting the transaxle to the vehicle;
a transaxle mounting collar that is one of fixedly mounted to or integrally formed with a housing of the transaxle; and
a prime mover operably coupled to the transaxle and fixedly mounted to the transaxle mounting collar absent any additional structure for mounting the prime mover to the vehicle such that the prime mover is cantilevered from the transaxle.

14. The vehicle of claim 13, wherein an output shaft of the prime mover is coupled directly to an input shaft of the transaxle.

15. The vehicle of claim 13, wherein the powertrain further comprising a transmission fixedly connected to the prime mover and the transaxle mounting collar absent any additional structure for mounting the transmission to the vehicle such that prime mover is operably coupled to the transaxle, via the transmission.

16. The vehicle of claim 13, wherein the prime mover comprises an prime mover-transmission unit having a transmission integrated with the prime mover, and the prime mover-transmission unit is operably coupled to the transaxle and fixedly mounted to the transaxle mounting collar absent any additional structure for mounting the prime mover-transmission unit to the vehicle such that the prime mover-transmission unit is cantilevered from the transaxle.

17. The vehicle of claim 16, wherein an output shaft of the prime mover-transmission unit is coupled directly to an input shaft of the transaxle.

18. The vehicle of claim 13, wherein the transaxle mounting collar comprises a sidewall having a mounting face formed along a distal edge of the sidewall to which the prime mover can be mounted, the mounting face having a surface area sized and shaped to support the prime mover absent any additional structure for mounting the prime mover to the vehicle such that the prime mover is cantilevered from the transaxle.

19. The vehicle of claim 18, wherein the powertrain further comprising at least one alignment pin extending from at least one of the prime mover mounting face and a mounting face of the prime mover, the at least one alignment pin structured and operable to:
  align an output shaft of the prime mover to an input shaft of the transaxle such that the prime mover output shaft is coupled directly to the transaxle input shaft, and
  support the prime mover absent any additional structure for mounting the prime mover to the vehicle such that the prime mover is cantilevered from the transaxle.

20. The vehicle of claim 19, wherein the transaxle mounting collar further comprises a plurality of gussets structured and operable to support the prime mover absent any additional structure for mounting the prime mover to the vehicle such that the prime mover is cantilevered from the transaxle.

\* \* \* \* \*

UNITED STATES PATENT AND TRADEMARK OFFICE
CERTIFICATE OF CORRECTION

PATENT NO. : 10,589,623 B1
APPLICATION NO. : 16/135406
DATED : March 17, 2020
INVENTOR(S) : Yohannes et al.

Page 1 of 1

It is certified that error appears in the above-identified patent and that said Letters Patent is hereby corrected as shown below:

On the Title Page

Item (72), add --Chris L. Normand, Martinez, GA (US)--

Signed and Sealed this
Tenth Day of November, 2020

Andrei Iancu
*Director of the United States Patent and Trademark Office*